(12) United States Patent
Fontes et al.

(10) Patent No.: US 8,812,500 B2
(45) Date of Patent: Aug. 19, 2014

(54) SYSTEM AND METHOD OF DISPLAYING RELATED SITES

(75) Inventors: Paul Fontes, Mountain View, CA (US); Othar Hansson, Sunnyvale, CA (US); Peter Jin Hong, San Francisco, CA (US); Benjamin N. Lee, Sunnyvale, CA (US); April Lehman, Mountain View, CA (US)

(73) Assignee: Google Inc., Mountain View, CA (US)

( * ) Notice: Subject to any disclaimer, the term of this patent is extended or adjusted under 35 U.S.C. 154(b) by 568 days.

(21) Appl. No.: 12/766,100

(22) Filed: Apr. 23, 2010

(65) Prior Publication Data

US 2010/0274775 A1 Oct. 28, 2010

Related U.S. Application Data

(60) Provisional application No. 61/172,471, filed on Apr. 24, 2009, provisional application No. 61/214,535, filed on Apr. 24, 2009.

(51) Int. Cl.
*G06F 17/30* (2006.01)
*G06F 17/00* (2006.01)

(52) U.S. Cl.
CPC ..................... *G06F 17/30* (2013.01)
USPC ......................... 707/736; 707/805

(58) Field of Classification Search
USPC ......................... 707/736, 805, 100
See application file for complete search history.

(56) References Cited

U.S. PATENT DOCUMENTS

| | | | |
|---|---|---|---|
| 6,404,446 B1 * | 6/2002 | Bates et al. | 715/854 |
| 7,496,558 B2 * | 2/2009 | Weiss et al. | 1/1 |
| 2006/0149721 A1 * | 7/2006 | Langford | 707/3 |
| 2006/0265417 A1 * | 11/2006 | Amato et al. | 707/102 |
| 2006/0287919 A1 * | 12/2006 | Rubens et al. | 705/14 |
| 2007/0067317 A1 * | 3/2007 | Stevenson | 707/100 |
| 2007/0100915 A1 | 5/2007 | Rose et al. | |
| 2007/0174332 A1 | 7/2007 | Stephens | |
| 2008/0082426 A1 * | 4/2008 | Gokturk et al. | 705/27 |
| 2008/0104100 A1 | 5/2008 | Richardson et al. | |
| 2008/0183664 A1 | 7/2008 | Cancel et al. | |
| 2008/0244408 A1 | 10/2008 | King et al. | |

OTHER PUBLICATIONS

International Search Report, PCT/US 10/32176, dated Jul. 2, 2010.
http://www.similarweb.com/ [online] [34 pages] [Retrieved from Internet Apr. 26, 2009].

(Continued)

*Primary Examiner* — Yicun Wu
(74) *Attorney, Agent, or Firm* — Lerner, David, Littenberg, Krumholz & Mentlik, LLP

(57) ABSTRACT

A system facilitates the display of thumbnail images containing images of websites related to a website currently being viewed by a user. The system may include several different components to provide the thumbnail images to the user, such as a graphical user interface, an input interface, and a processor. The graphical user interface may display a website for viewing by a user and the input interface may receive an input representative of a request for a related website. The processor may transmit the request for the related website to a search engine, and, in response, the processor may obtain a search result representative of the related website. Moreover, the search result may include several components, such as a related website image representative of the related website and a uniform resource locator ("URL") representative of a location of the related website.

18 Claims, 16 Drawing Sheets

(56) References Cited

OTHER PUBLICATIONS http://lifehacker.com/5143690/similarweb-suggests-related-web-sites [online] [4 pages] [Retrieved from Internet Jun. 13, 2012].
http://news.cnet.com/8301-17939_109-10153478-2.html [online] [2 pages] [Retrieved from Internet Jun. 13, 2012].
http://downloadsquad.switched.com/2009/03/27/similarweb-for-firefox-helps-you-find-web-sites-you-might-like/ [online] [3 pages] [Retrieved from Internet Jun. 13, 2012].
https://addons.mozilla.org/en-US/firefox/addon/similarweb-sites-recommendatio/versions/?page=1#version-0.8.5.16 [online] [6 pages] [Retrieved from Internet Jun. 13, 2012].
http://www.dailygyan.com/2009/02/similarweb-firefox-extension-helps-you.html [online] [3 pages] [Retrieved from Internet Jun. 13, 2012].
http://howwebworks.net/find-your-competitor-with-similarweb-add-ons/ [online] [3 pages] [Retrieved from Internet Jun. 13, 2012].

* cited by examiner

MSN.com
MSN is Microsoft's portal, offering MSNBC News, sports, MSN Money, games, videos, entertainment & celebrity gossip, weather, shopping and more great content ...
www.msn.com/ - 54k - 6 hours ago - Cached - Similar pages

The top news headlines on current events from Yahoo! News
Use Yahoo! News to find breaking news, current events, the latest headlines, news photos, analysis & opinion on top stories, world, business, politics, ...
news.yahoo.com/ - 157k - 1 hour ago - Cached - Similar pages

Video - Breaking News Videos from CNN.com
Nov 16, 2005 ... Watch the latest breaking news, politics, entertainment and offbeat videos everyone is talking about at CNN.com. Get informed now!
edition.cnn.com/video/ - 48k - Cached - Similar pages

World News - International Headlines, Stories and Video from CNN.com
CNN brings you headlines, video and news stories from Europe, Asia, Africa, the Middle East, and the Americas.
www.cnn.com/WORLD/ - 62k - 3 hours ago - Cached - Similar pages

CNNTurk.com - Türkiye, Dünya, Ekonomi, Finans, Spor, Sağlık ... - [ Translate this page ]
Türkiye ve dünya gündeminde yer bulan haberlere yer veriliyor. Site aracılığı ile CNN Turk televizyonu canlı olarak izlenebilir.
www.cnnturk.com/ - 116k - 17 minutes ago - Cached - Similar pages

San Francisco Bay Area — News, Sports, Business, Entertainment ...
Daily newspaper for the greater San Francisco area. Includes global news, regional information, classifieds, and entertainment.
www.sfgate.com/ - 123k - 21 minutes ago - Cached - Similar pages

Sydney Morning Herald - Business & World News Australia | smh.com.au
Apr 23, 2009 ... Breaking news from Sydney, Australia and the world. Features the latest business, sport, entertainment, travel, lifestyle, and technology ...
www.smh.com.au/ - 19 minutes ago - Similar pages

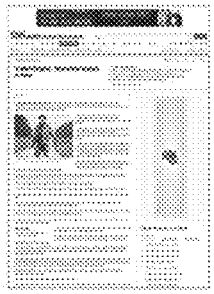
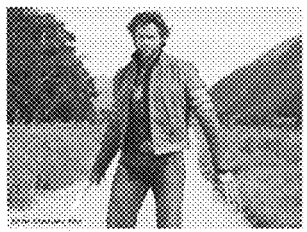
Figure 16 (a)
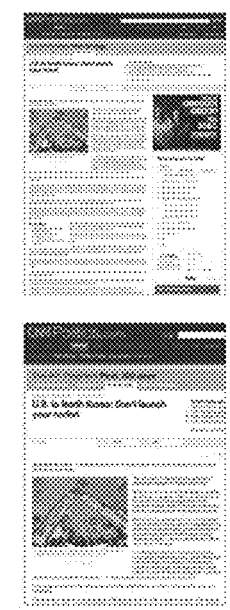
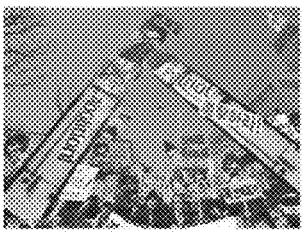
Figure 16 (b)

SYSTEM AND METHOD OF DISPLAYING RELATED SITES

CROSS-REFERENCE TO RELATED APPLICATIONS

This application claims the benefit of U.S. Provisional Patent Application No. 61/172,471, filed Apr. 24, 2009, and of U.S. Provisional Patent Application No. 61/214,535, filed Apr. 24, 2009, the entire disclosures of which are hereby incorporated by reference herein.

BACKGROUND

Recent research suggests that Internet users spend much of their time doing general-purpose browsing on the Internet searching for websites of interest. Using a search engine provider, a user may be able to use the search engine of the search engine provider to find a website of interest. However, to find a website of interest, the search engine often requires input from the user, usually in the form of a search query. Hence, the ability of a search engine to find a website of interest to the user is limited by the user's ability to enter in a relevant search query. The search query may be too broad, too narrow, or use search terms that are not understood or properly interpreted by the search engine. Moreover, once the search engine has found a website matching the search query, the search engine generally does not continue searching for websites that may be related to the initial search query.

Additionally, research suggests that while a search engine provider is commonly used for directed tasks, like fact-finding and information gathering, it may not be used for general Internet browsing. Moreover, a user may spend as much time browsing as he or she does in either fact-finding or information gathering tasks.

In one regard, the Internet usage of a user may be classified into four general categories: (1) fact-finding, which includes searching for weather information, a phone number, a recipe, definitions, movie times, or other factual information; (2) information gathering, which includes searching for information on various products and services, such as information on a new laptop, product prices, help with a virus, renting a car, or other information gathering activities; (3) browsing, such as visiting various websites of interests, which may be performed as a leisurely activity; and (4) electronic transactions, such as communicating through e-mail, instant messaging, online purchases, or other electronic transactions. Because browsing is often considered distinct from fact-gathering or information gathering, search engine providers and Internet web browsers generally do not provide an incentive to perform fact-gathering or information gathering while browsing.

SUMMARY

Systems and methods are provided for displaying images of related websites. In one aspect, the images are sized so as to convey an overall impression of the entire related website as well as a more detailed view. In still another aspect, the details are displayed by zooming the image or the related webpage to a portion that is likely to contain information that is likely to allow the user to quickly decide whether to visit the related site. In yet a further aspect, the image is zoomed to the top-left or top-right corner depending on whether the language of the site reads left-to-right or right-to-left, respectively.

In one embodiment, a system for displaying images of websites related to a viewed website is provided. The system includes a graphical user interface operative to display a website for viewing by a user and an input interface operative to receive an input representative of a request for a related website that is related to the website for viewing by the user. The system also include a processor operative to receive a request for the related website that is related to the website being viewed by the user and transmit the request for the related website to a search engine operative to search for the related website. Moreover, the processor is operative to obtain a search result representative of the related website.

The search result includes a related website image representative of the related website and a uniform resource locator representative of a location of the related website. Furthermore, the graphical user interface is further operative to display the search result simultaneously with the website for viewing by the user.

In one aspect of the system, the graphical user interface is further operative to display the search result simultaneously with the website for viewing by the user by displaying a personalized portion within the graphical user interface adjacent to the website for viewing by the user, and displaying the search result within the personalized portion. In another aspect of the system, the processor is further operative to render the related website image based on the uniform resource locator of the search result.

In a further aspect of the system, the related website is determined as being related to the website for viewing by the user based on comparing textual content of the related website with textual content of the website for viewing by the user. In yet another aspect of the system, the related website is determined as being related to the website for viewing by the user based on comparing the visual similarity of the related website and the website for viewing by the user.

In yet a further aspect of the system, the search result is a first search result and the processor is further operative to obtain a set of search results comprising the first search result. In this aspect of the system, each search result of the set of search results is a different search result, and each search result includes a related website image representative of the related website and a uniform resource locator representative of a location of the related website. Moreover, in this aspect of the system, the graphical user interface is further operative to display the set of search results simultaneously with the website for viewing by the user.

In another aspect of the system, the graphical user interface is further operative to display the related website image in a landscape orientation. In a further aspect of the system, the related website image includes a webpage of the related website and the webpage of the related website is completely displayed in the related website image.

In yet another aspect of the system, the related website image includes a webpage of the related website and the webpage of the related website is partially displayed in the related website image. In yet a further aspect of the system, the related website includes a homepage that is displayable to the user as a front page of the related website when the user visits the related website, and a webpage that is displayable to user that is different than the homepage. In this aspect of the system, the related website image includes the webpage of the related website.

A method for displaying images of websites related to a viewed website is also provided. In one aspect, the method includes displaying, on a display device, a website for viewing by a user and receiving with an input interface an input representative of a request for a related website that is related to the website for viewing by the user. The method may also include transmitting, with a processor, the request for the related website to a search engine operative to search for the related website, and obtaining, with the processor, a search result representative of the related website.

In addition, the search result may include a related website image representative of the related website and a uniform resource locator representative of a location of the related website. The method may also include displaying, on the display device, the search result simultaneously with the website for viewing by the user.

In one aspect of the method, the method further includes displaying the search result simultaneously with the website for viewing by the user by displaying a personalized portion within the graphical user interface adjacent to the website for viewing by the user, and displaying the search result within the personalized portion. In another aspect of the method, the method may include rendering, with the processor, the related website image based on the uniform resource locator of the search result. In a further aspect of the method, the related website is determined as being related to the website for viewing by the user based on comparing textual content of the related website with textual content of the website for viewing by the user.

In yet another aspect of the method, the related website is determined as being related to the website for viewing by the user based on comparing the visual similarity of the related website and the website for viewing by the user.

In yet a further aspect of the method, the search result is a first search result, and the method further includes obtaining a set of search results comprising the first search result. In this aspect of the method, each search result of the set of search results is a different search result, and each search result includes a related website image representative of a related website and a uniform resource locator representative of a location of the related website. In this aspect of the method, the method may also include displaying, on the display device, the set of search results simultaneously with the website for viewing by the user.

In another aspect of the method, the method may include displaying, on the display device, the related website image in a landscape orientation. In a further aspect of the method, the related website image may include a webpage of the related website and the method may further include displaying, on the display device, the webpage of the related website such that the webpage of the related website is completely displayed in the related website image.

In yet another aspect of the method, the related website image includes a webpage of the related website, and the method may further include displaying, on the display device, the webpage of the related website such that the webpage of the related website is partially displayed in the related website image.

In yet a further aspect of the method, the related website may include a homepage that is displayable to the user as a front page of the related website when the user visits the related website and a webpage that is displayable to user that is different than the homepage. Moreover, in this aspect of the method, the related website image includes the webpage of the related website.

BRIEF DESCRIPTION OF THE DRAWINGS

FIG. 4 illustrates an example of search results that may be returned in response to a request for related websites.

FIG. 16(*a*) and FIG. 16(*b*) illustrate alternative examples of modifying the content of a webpage displayed in a thumbnail image.

DETAILED DESCRIPTION

Figure 1:
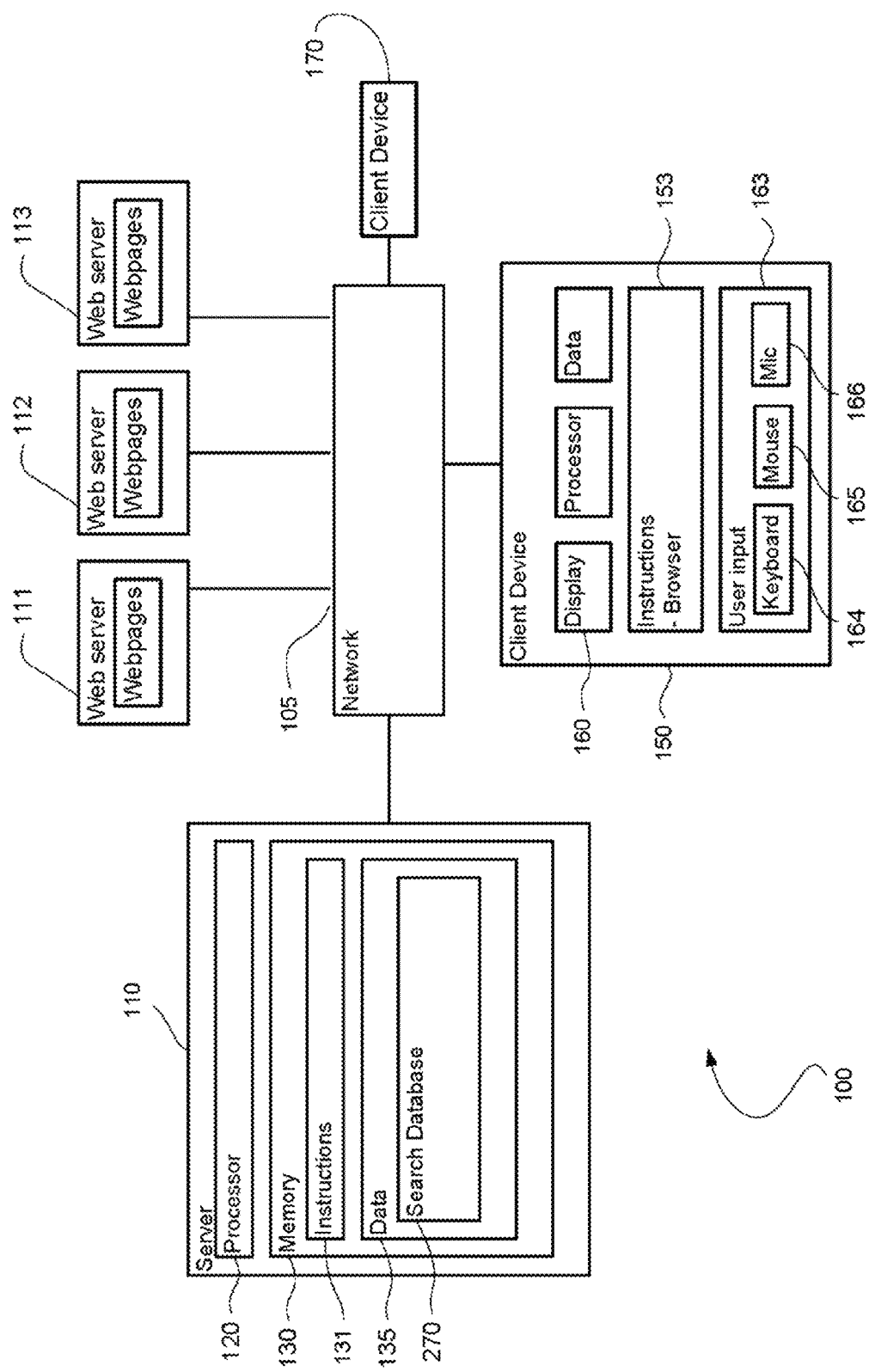
FIG. 1 illustrates an example of a system that displays related websites.
Figure 2:
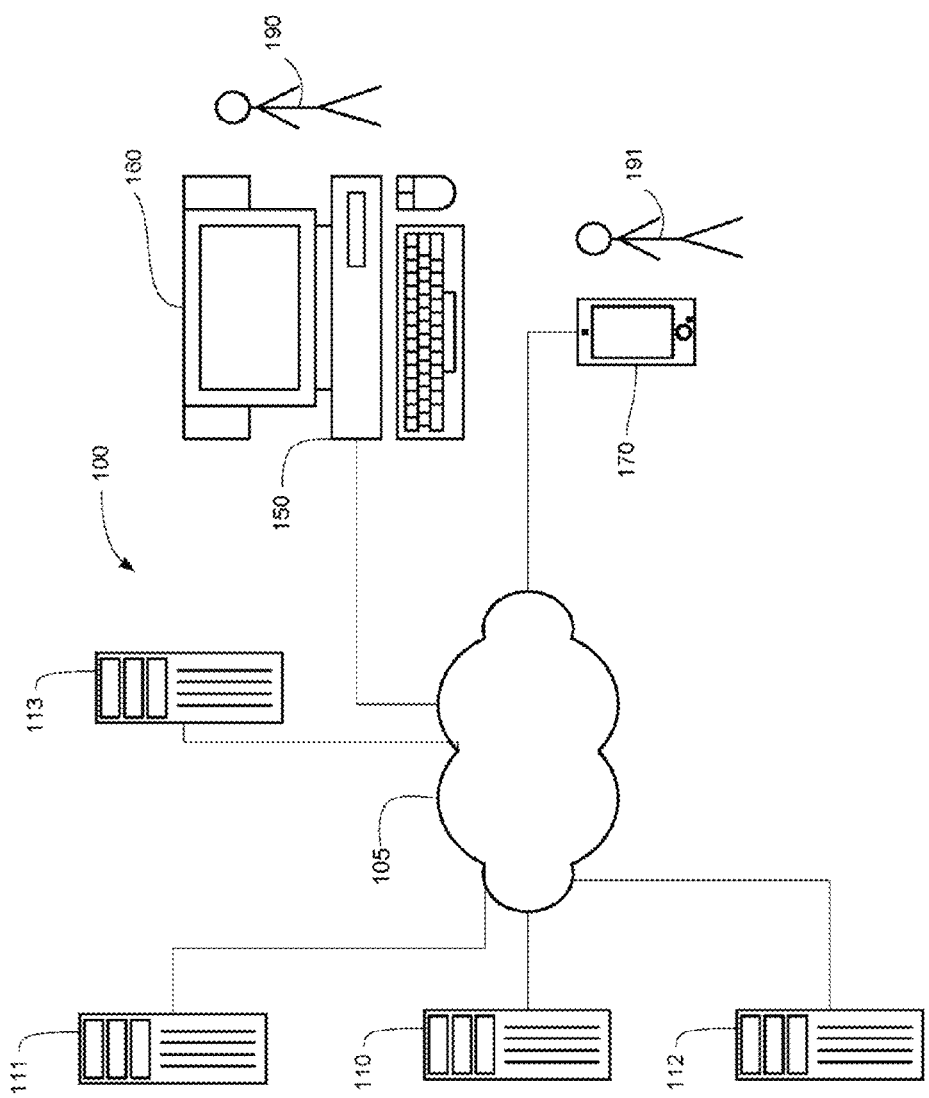
FIG. 2 illustrates an example of a client device in communication with multiple servers hosting webpages.

As shown in FIGS. 1-2, a system 100 in accordance with one aspect of the invention includes a computer 110 containing a processor 120, a memory 130 and other components typically present in general purpose computers.

Memory 130 is configured to store information accessible by the processor 120, such as instructions 131 that may be executed by the processor 120. It also includes data 135 that may be retrieved, manipulated or stored by the processor. The memory may be of any type of memory operative to store information accessible by the processor, such as a hard-drive, memory card, ROM, RAM, DVD, CD-ROM, write-capable, and read-only memories. The processor 120 may be any well-known processor, such as processors from available from the Intel Corporation, located in Santa Clara, Calif., or Advanced Micro Devices, located in Sunnyvale, Calif. Alternatively, the processor may be a dedicated controller, such as an ASIC, or any other processor or controller now known or later developed.

The instructions 131 may be any set of instructions to be executed directly (such as machine code) or indirectly (such as scripts) by the processor 120. In that regard, the terms "instructions," "steps" and "programs" may be used interchangeably herein. The instructions 131 may be stored in object code format for direct processing by the processor 120, or in any other computer language including scripts or collections of independent source code modules that are interpreted on demand or compiled in advance. For example, instructions 131 may include search instructions for executing searches, and may include update instructions for sending update information. Functions, methods and routines of the instructions are explained in more detail below.

Data 135 may be retrieved, stored or modified by processor 120 in accordance with the instructions 131. For example, although the system and method is not limited by any particular data structure, the data 135 may be stored in computer registers, in a relational database as a table having a plurality of different fields and records, extensible markup language ("XML") documents, or flat files. The data may also be formatted in any computer-readable format such as, but not limited to, binary values, ASCII or Unicode. By further way of example only, image data may be stored as bitmaps comprised of pixels that are stored in a compressed or uncompressed format, or lossless or lossy formats (e.g., JPEG), vector-based formats (e.g., SVG) or computer instructions for drawing graphics. The data may comprise any information sufficient to identify the relevant information, such as numbers, descriptive text, proprietary codes, pointers, references to data stored in other memories (including other network locations) or information that is used by a function to calculate the relevant data.

Data 135 may include a search database 270 for use when executing search instructions. Data 135 may also include information gathered from other nodes of the network relating to suspicious activity. In one implementation, the search database 270 associates identifications of websites with values indicative of whether the website is likely to be associated with unwanted behavior. The search database 270 may also include assigned values indicative of relatedness between websites based on the amount of similarity between the textual content of websites. Alternatively, the assigned values may indicate the relatedness between websites based on the amount of similarity between the graphical content of websites. Server 110 may access data 135 when performing functions described below.

Although FIG. 1 functionally illustrates the processor 120 and memory 130 as being within the same block, it will be understood by those of ordinary skill in the art that the processor 120 and memory 130 may actually comprise multiple processors and memories that may or may not be stored within the same physical housing. For example, some of the instructions 131 and data 135 may be stored on removable CD-ROM and others within a read-only computer chip. Some or all of the instructions 131 and data 135 may be stored in a location physically remote from, yet still accessible by, the processor 120. Similarly, the processor 129 may actually comprise a collection of processors which may or may not operate in parallel.

In one aspect, computer 110 is a server communicating with one or more client devices 150 and 170. For example, computer 110 may be a web server operative to provide one or more webpages for one or more websites to the client device 150, the client device 170, or both. Each client device 150 and 170 may be configured similarly to the server 110, with a processor, memory and instructions. Each client device 150 and 170 may be a personal computer, intended for use by a person 190-191, having all the internal components normally found in a personal computer such as a central processing unit (CPU), display device 160 (for example, a monitor having a screen, a projector, a touch-screen, a small LCD screen, a television, or another device such as an electrical device that is operable to display information processed by the processor), CD-ROM, hard-drive, user input interface 163 (for example, a mouse, keyboard, touch-screen or microphone), speakers, modem and/or network interface device (telephone, cable or otherwise) and all of the components used for connecting these elements to one another. Moreover, computers in accordance with the systems and methods described herein may comprise any device capable of processing instructions and transmitting data to and from humans and other computers including general purpose computers, personal display assistants ("PDAs"), network computers lacking local storage capability, and set-top boxes for televisions.

Although the client devices 150 and 170 may comprise a full-sized personal computer, the system and method may also be used in connection with mobile devices operative to wirelessly exchange data with a server over a network. Examples of networks include a Local Area Network ("LAN"), a Wide Area Network ("WAN"), such as the Internet, and a Personal Area Network ("PAN"). For example, a client device 170 may be a wireless-enabled PDA such as a Blackberry phone or an Internet-capable cellular phone. In either regard, the user 190 or 191 may input information using input interface 163, such as a small keyboard (in the case of a Blackberry phone), a keypad (in the case of a typical cell phone), a touch screen (in the case of a PDA) or any other means of user input.

The server 110 and client devices 150 and 170 are operative to communicate directly, indirectly, or both, such as over the network 105, the network 105, or over alternative networks. For example, server 110 may receive a search request from the client device 150. Processor 120 may execute the instructions 131 to search for data in the search database 270, and may provide the search data as search results. Server 110 may send the search results to the client device 150 for display to the user 190.

Server 110 and client devices 150 and 170 may also communicate directly, indirectly, or both, with additional computers on the network 105. For example, web servers 111, 112 and 113 are also connected to network 105. Although a few computers are depicted in FIGS. 1-2, it should be appreciated that a typical system may include a large number of computers, each different computer being at a different node of the network 105.

The network 105, and intervening nodes, may comprise various configurations and protocols including the Internet, World Wide Web, intranets, virtual private networks, wide area networks, local networks, private networks using communication protocols proprietary to one or more companies, Internet relay chat channels (IRC), instant messaging, simple mail transfer protocols (SMTP), Ethernet, WiFi and HTTP, any other networking protocol now known or later developed, and various combinations of the foregoing. Such communication may be facilitated by any device operative to transmit data to and from other computers, such as modems (e.g., dial-up, cable or fiber optic) and wireless interfaces.

Server 110 may include a search engine, including an index that identifies websites in accordance with various criteria. For example, in response to queries provided by client device 150 via a browser 153, server 110 may provide search results. The Google search engine, located at www.google.com, and the Yahoo! search engine, located at www.yahoo.com, are examples of search engines.

As noted above, network 105 may further include additional servers such as servers 111-113, each of which may serve web pages associated with one or more websites.

Various operations in accordance with a variety of aspects of the invention will now be described. It should be understood that the following operations do not have to be performed in the precise order described below. Rather, various steps can be handled in reverse order, simultaneously, or in any other order.

Figure 3:
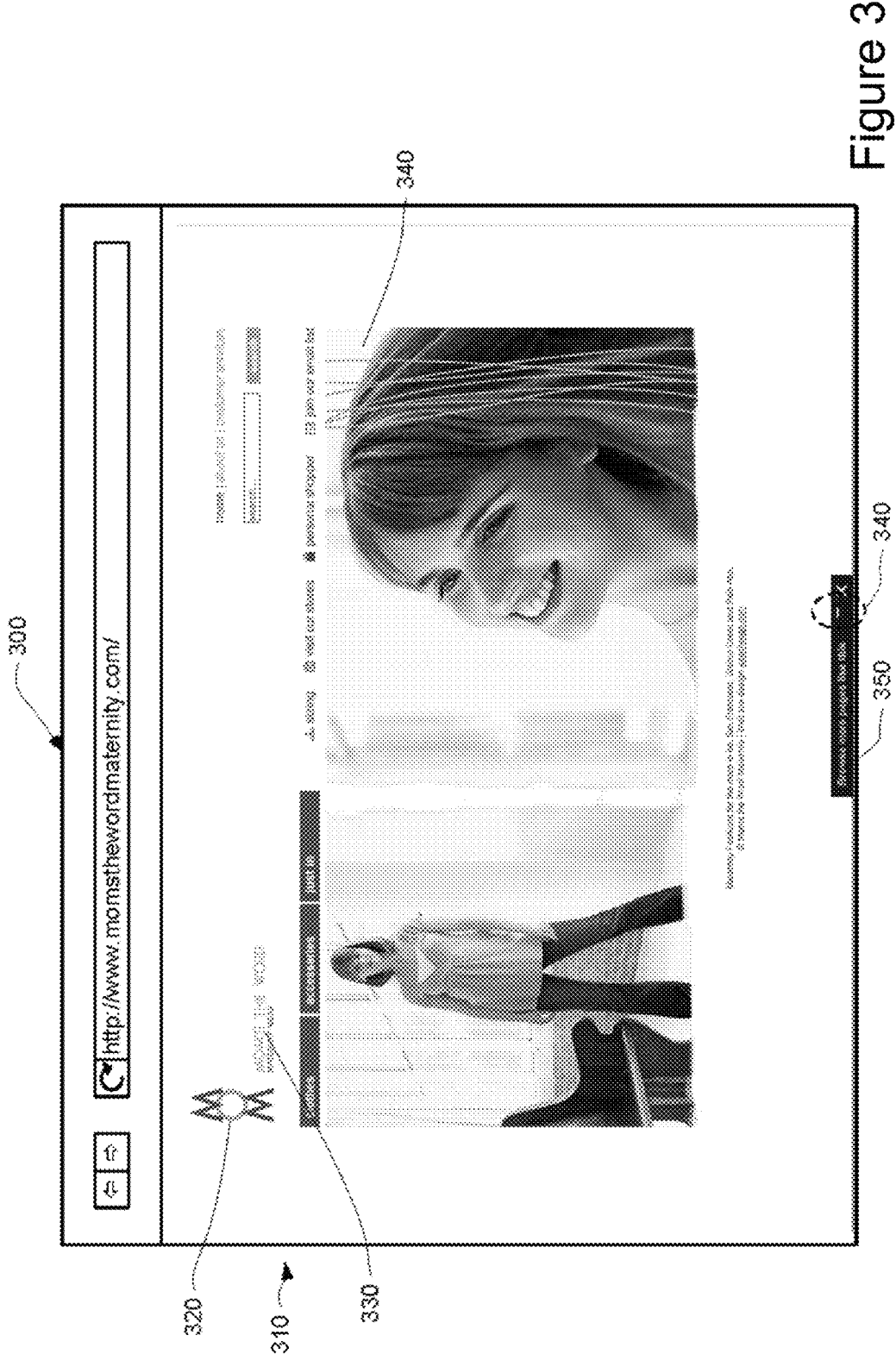
FIG. 3 illustrates an example of a graphical user interface for interacting with a website.

FIG. 3 illustrates one example of a web browser 300 for interacting with a webpage 310. The browser 300 may include a graphical user interface for interacting with the browser 300, the webpage 310, or both. As shown in the illustration of FIG. 3, a user may access a first website (e.g., http://www.momsthewordmaternity.com/) via the graphical user interface 300. Examples of web browsers include Internet Explorer, available from the Microsoft Corporation, located in Redmond, Wash., Firefox, available from the Mozilla Foundation, located in Mountain View, Calif. and Google Chrome, available from Google Inc., located in Mountain View, Calif. In addition, the browser 300 may also comprise a browser in combination with code executing as a browser extension, such as in the context of a third party plug-in architecture for a browser.

The webpage 310 may include a variety of content including text, graphical elements and sounds. For example, the webpage 310 may include a logo 320 as a graphical element, where the logo 320 includes a company name and is placed in a portion of the webpage 310. The logo 320 may be placed in any portion of the webpage 310, such as the top-left corner of the webpage 310.

Text 330 may identify the subject matter of the webpage 310, the website 310 (e.g., maternity wear) as well as information particular to the site such as images 340 or textual descriptions of the products it sells.

The webpage 310 may be a homepage for a corresponding website. In general, a homepage is a webpage displayable to the user as a front page of the corresponding website. However, the webpage 310 may also be a webpage different from the homepage.

As the user is viewing the site, the browser 300 may display an input interface 350 operative to receive an input representative of a request for a related website that is related to the website of the webpage 310 being viewed by the user. The input interface 350 may include an indication on or adjacent to the webpage 310 that represents an inquiry as to whether the user is interested in viewing one or more related websites. The user may elect to view related websites by, for example, clicking on the indication.

Systems and methods according to the invention may use any number of techniques to identify one or more related websites. By way of example only, upon receiving an indication from the user that one or more related websites are to be displayed, the browser 300 may transmit a request for the related website to a search engine operative to search for the related website. In one implementation, the browser 300 transmits the identity of the website being viewed by the user along with a request for a list of one or more related websites to the server 110. As one example of a request for a related website, the request may be sent in the form of a query to a search engine using a search engine operator, such as the Google search engine operator "related".

In one implementation, the request may be sent to a predetermined format. For example, the request may be in the format of [related:<webpage>], where "related" indicates the "related" operator and "<webpage>" indicates the webpage for which the search engine is to find related webpages or websites. In response to the request, the server 110 may return webpages or websites that are similar to the specified web page. As one example, the request [related:cnn.com] instructs the search engine to return a list of webpages that are similar to the homepage for the CNN website. The list of webpages that are similar to the homepage for the CNN website may be ordered, such as by descending order of expected similarity.

The system and method is not limited to any particular method of determining whether, and how much, two web sites are related. For example, pairs of webpages may be assigned values indicative of relatedness based on the amount of similarity between their textual content. In other words, a related website may be determined as being related to a website being viewed by a user based on a comparison of textual content of the related website with the textual content of the website being viewed by the user. A webpage at another website may thus be considered very related to webpage 310 if it is a homepage and similarly and prominently displays relatively few words 330, "maternity" and "clothes" being among them.

A processor, such as the client processor or the server processor 120, may also calculate a relatedness value based in part on a comparison of the visual similarity of the first webpage with the second webpage. In other words, a related website may be determined as being related to a website being viewed by a user based on comparing the visual similarity of the related website and the website being viewed by the user. For example, a pair of webpages may be considered to be related if—in addition to their textual content—the images on the webpages are similar and the layout of the text and images are similar.

Accordingly, and in response to the request for one or more related websites, the browser 300 may obtain a search result representative of one or more related websites. In one implementation, the search result may include the name of related websites, the uniform resource locator ("URL") representative of a location for each of the related websites, and a short description of the website. The name of the related website, the URL, and the short description of the website may be considered the related data for the website. In one implementation, a Boolean identifier may be associated with the website indicating whether there is related data for the website. In some circumstances, a website may not have related data. In other circumstances, a website may have related data.

FIG. 4 illustrates one example of search results 402 that the browser 300 may obtain in response to the request "related: cnn.com". Upon receiving the list of related websites 402, the browser 300 may then obtain website images representative of each of the websites.

In one aspect, a request for a related website may be invoked by a user while viewing a webpage containing search results provided by the search engine provider. In accordance with this aspect, the search engine provider may also display one or more "explore this" links on the results webpage that may be selected, such as by clicking with a mouse cursor, by the user. Upon determining that an "explore this" link associated with a particular search result has been clicked by the user, the search engine provider may display provided suggestions to the user in a separate element on the webpage, such as within an inline frame of a webpage (an "iframe").

Figure 5:
FIG. 5 illustrates an example of displaying thumbnail images of related webpages.

As shown in FIG. 5, the images of the related websites may be displayed as thumbnail images 501-504. The thumbnail images 501-504 may be obtained by the browser 300 based on the URLs provided in the search result. For example, the browser 300 may download the webpage located at the URL of the first search result. Upon loading the webpage, the browser 300 may render the webpage as a small bitmap image (i.e., a "thumbnail image"). The graphical user interface of the browser 300 may then display the small bitmap image to the user. This process may continue for all or a given number of the search results. While all of the results may be not be capable of being displayed at the same time, the user may scroll and view more thumbnail images of webpages by selecting an element on the graphical user interface of the browser 300, such as a designated button 580 or pressing a particular key on a keyboard.

In another aspect, the thumbnail images 501-504 are rendered and provided by the server 110 to the client device 150 or 170 along with the search results. The server 110 may obtain and render the thumbnail images either in advance or in response to a request from the client device 150 or 170.

The thumbnail images may be shown in one or more orientations, such as a portrait orientation, a landscape orientation, or a combination of portrait and landscape orientations. In other words, the browser 300 may display the thumbnail images 501-504 as to be greater in height than in width. For example, thumbnail images sized at a height:width ratio of 1.5:1 are generally considered to be advantageous when displaying content from certain websites because the increased height allows more of a webpage to be displayed than shorter thumbnail images.

In one implementation, the browser 300 may display at least some of the related webpages rendered such that the width of the webpage displayed in the thumbnail image stretches across the entire width of the thumbnail image (or nearly the entire width in view of margins). In other words, the webpage of a related website may be completely displayed in a related website image for the related website. In addition, the browser 300 or the server 110 may manipulate the thumbnail image to display the entirety of the related webpage. For example, the webpage associated with thumbnail image 501 may be down-sampled so that its left-most content is within and adjacent to the left boundary of the thumbnail image 501, its right-most content is within and adjacent to the right boundary of the thumbnail image 501, and the top edge of the webpage is within and adjacent to the top boundary of the thumbnail image 501.

Alternatively, the webpage of the related website may be partially displayed in the related website image. For example, where the height of the webpage is not capable of fitting within the thumbnail image, the top portion of the webpage that fits within the height of the thumbnail image may be displayed.

In other words and in one aspect, the webpage is sized to fit within a thumbnail image of fixed size so as to emphasize the overall visual appearance of the webpage rather than merely the top of the page.

In one aspect, the thumbnails show the homepage of the related site, such as in thumbnail image 503. In another aspect, the thumbnail image may show a webpage that is considered to be the most related to the currently viewed page, whether it is the homepage of the corresponding website or another webpage of the website.

The thumbnail images 501-504 may also provide additional information. For example, a thumbnail image may show the name of a webpage. The browser 300 may show the name a webpage as text 520. The browser 300 may alternatively or additionally show all or a portion of the URL 520 of the related website or webpage. In yet another aspect, the thumbnail image may also display additional information, such as by displaying a description of the website as a pop-up when the user hovers over the thumbnail image. In general, a "pop-up" is a window of a graphical user interface that is displayed to the user by being overlaid on top of another window containing the content currently being viewed by the user.

As shown in FIG. 5, the images may be shown on a portion 510 of the webpage as an opaque or semi-transparent overlay on the webpage itself. The thumbnail images 501-504 may also be shown adjacent to the webpage in the same window of the graphical user interface for the browser 300 or in another location, such as a separate window of the graphical user interface.

Figure 6:
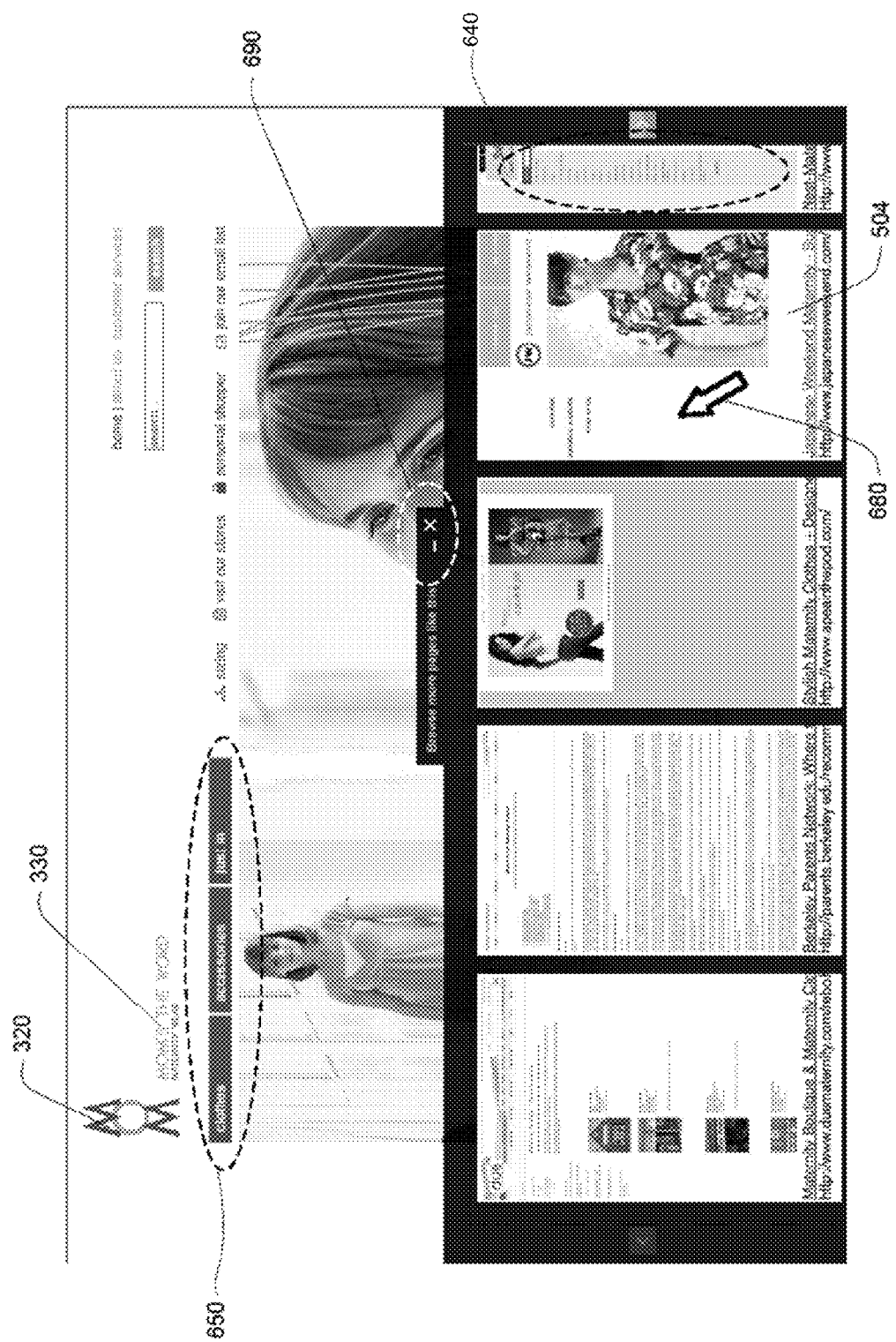
FIG. 6 illustrates an example of altering a thumbnail image from FIG. 5.
Figure 7:
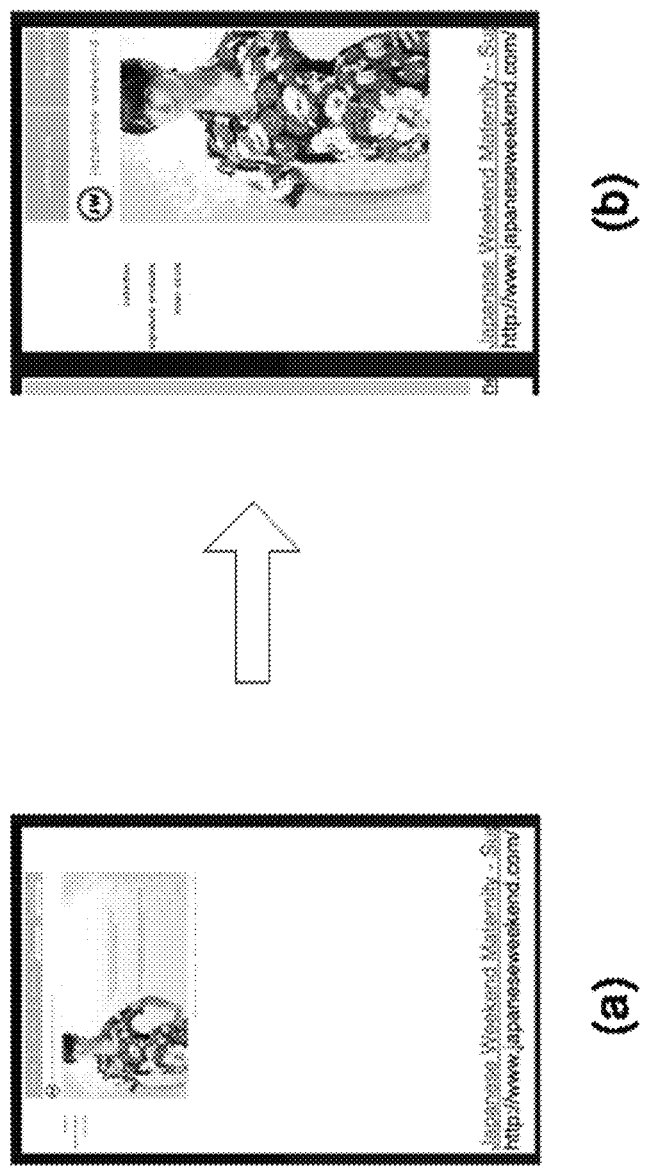
FIG. 7 illustrates an example of zooming in on a portion of a webpage shown in a thumbnail image.

The browser 300, the server 110, or a combination thereof, may change or alter a thumbnail image of a related website in response to user input. For example, as shown in FIG. 6, a user may place a mouse cursor 680 over a thumbnail image 504. In response, the browser 300 may zoom in on the webpage or a portion of the webpage shown in the thumbnail image 504. FIG. 7 compares the thumbnail image 504 of the related site before and after zooming in on a portion of the webpage shown in the thumbnail image 504 (7(a) and 7(b), respectively).

The thumbnail image 504 may be altered so as to zoom in on another portion of the webpage shown in the thumbnail image. For example, the thumbnail image 504 may be altered such that the top-left corner of the related webpage is displayed adjacent to the top-left boundary of the thumbnail.

In a further aspect, the top-left or top-right corner of the webpage may be zoomed based on a language used by the website. For example, where the language of the words on the website are typically sequenced from left to right (such as English words written in the English alphabet), the webpage may be displayed in the thumbnail image 504 and zoomed to display the top-left corner. However, where the language of the words of the website are typically sequenced from right to left (such as Arabic words written in the Arabic language), the webpage displayed in the thumbnail image 504 may be zoomed towards the top-right corner. Languages that may be written in multiple directions (such as Chinese characters) may be zoomed to either a default corner or the webpage may be examined to determine the starting corner of the text.

In many circumstances, some of the most important information on a website—as far as users quickly determining whether they are interested visiting in viewing the site—is placed in the corner at which the user typically begins reading. As shown in FIG. 6, this information may include, for example, the company logo 320 and the company name 620. The corner of a website also tends to be where most websites start the list of sections or frequently-accessed pages, which may run either vertically as in list 640 or horizontally as in list 650.

The below description provides additional implementation details of the browser 300 in displaying or rendering one or more thumbnail images. However, and as mentioned above, where the browser 300 is described as displaying or rendering a webpage or website in a thumbnail image, another system may also perform the displaying or rendering of the webpage or website in the thumbnail image, such as the server 100, the servers 111-113, or any other system.

In one implementation, the browser 300 may initially render as much of the webpage as possible so as to emphasize the overall visual appearance of the webpage rather than specific details. In one aspect, when a user indicates an interest in learning more, the browser 300 may decrease the emphasis on overall appearance and may increase the emphasis on more details. Moreover, the browser 300 may zoom to a portion of the webpage that is most likely to contain information that allows the user to quickly determine whether the website is interesting.

In addition, the rendering and display of the overall view of a webpage in a thumbnail image may assist users to quickly determine whether they are interested in a related website. For example, the overall view may allow a user to quickly determine that a related website with sophisticated photography (such as website displayed in the thumbnail image 503 in FIG. 5) is a retail clothing site and a related website of text (such as the website displayed in the thumbnail image 502) comprises information intended to educate or inform. The overall visual patterns shown in a webpage may thus provide useful information. In some circumstances, the user may be able to determine the type of website by the overall visual patterns without looking at a single detail or reading a single word. The overall view of the webpage or website may also be sufficient to invoke the user's recollection if the user has visited the webpage or website before.

However, the browser 300 may facilitate providing additional information to the user when the user prefers additional details to make a more informed choice, such as when the user may be unfamiliar with the website. The additional information may be obtained by simply moving the mouse and without going to a different webpage.

Yet further, the browser 300 may focus on details that are likely to allow the user to make a quick and visually-based decision. The user is typically not required to read a great deal of additional text-based information. Rather, the information at the top-left (or top-right) corner of the webpage displayed in the thumbnail image tends to include discrete words that are more quickly processed than long sentences or long strings of words.

Moreover, the browser 300 may provide for the foregoing (allowing the user to zoom from overall appearance to potentially important details) without changing the other information displayed on the webpage of the thumbnail image. For example, the boundary of the zoomed thumbnail image 504 may remain static, as do the other thumbnails and the remainder of the webpage. Keeping the boundary of the zoomed thumbnail image 504 static may not only be less distracting; but it may also prevent the other thumbnail images from being obscured, which may assist the user to easily compare and continue comparing a webpage under scrutiny with the one or more webpages.

However, the browser 300 may provide other facilities for inspecting the thumbnail images 501-504. For example, all of the thumbnail images 501-504 may zoom in at the same time. In still another aspect, a user may pan one or more of the webpages displayed within the thumbnail images 501-504 within the bounds of a thumbnail image by dragging the page with the mouse cursor 680.

If the user indicates no interest in a related webpage or website displayed in a thumbnail image 504, such as by moving the cursor 680 off of the thumbnail image 504 without selecting it, such as by clicking on the thumbnail image 504, the thumbnail image 504 may zoom back out to display the webpage prior to the zooming of the thumbnail image 504. The user may then be free to look at the thumbnail images of the other related websites in more detail.

If the user is not interested in any of the related websites or webpages displayed in the thumbnail images 501-504, the user may minimize or close the panel of related sites by selecting a graphical user interface element, such as by clicking icons 660 appropriately.

Figure 8:
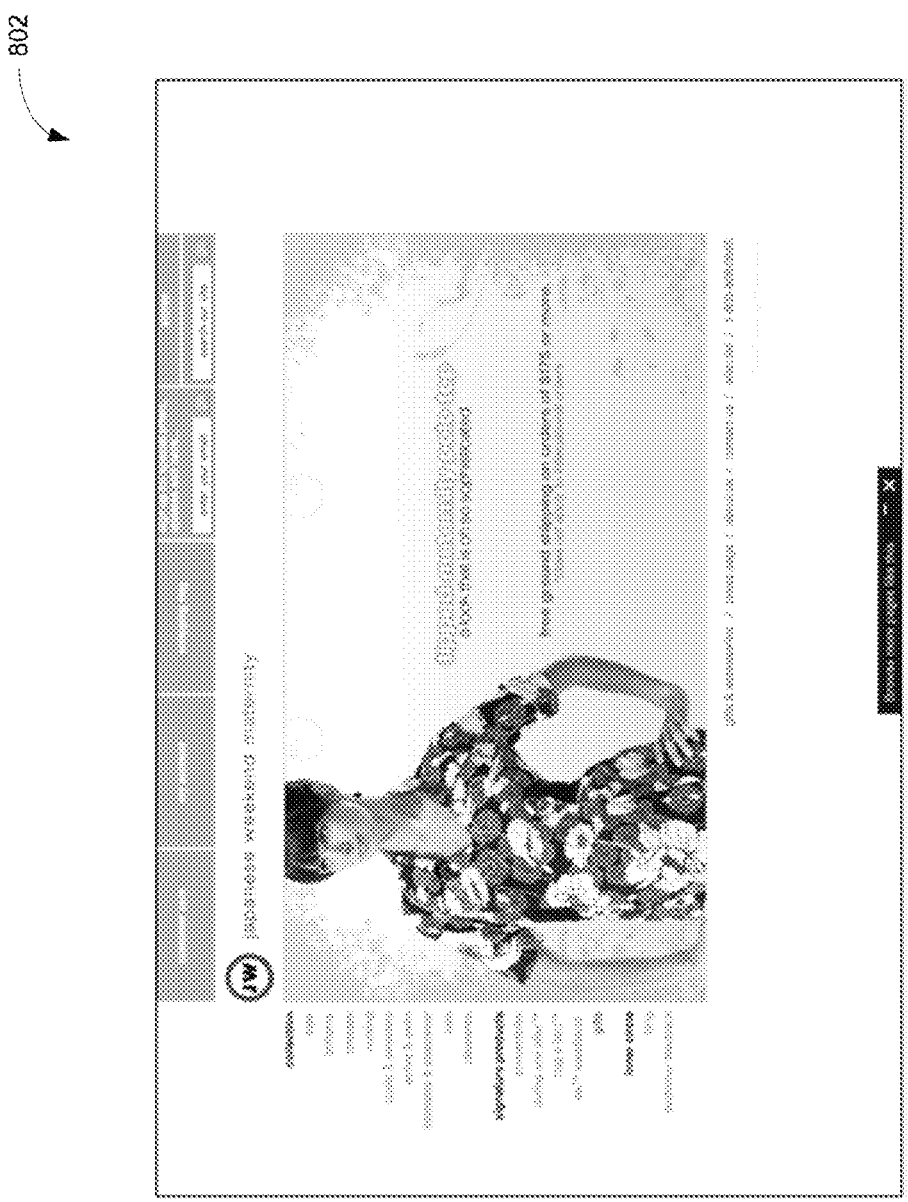
FIG. 8 illustrates an example of displaying a selected related webpage.

However, where the user is interested in one or more related webpages or websites, the user may navigate to the site by clicking or otherwise selecting a corresponding thumbnail image. In that regard, the Internet browser 300 may load and display the related webpage or website 802 as shown in FIG. 8.

Figure 9:
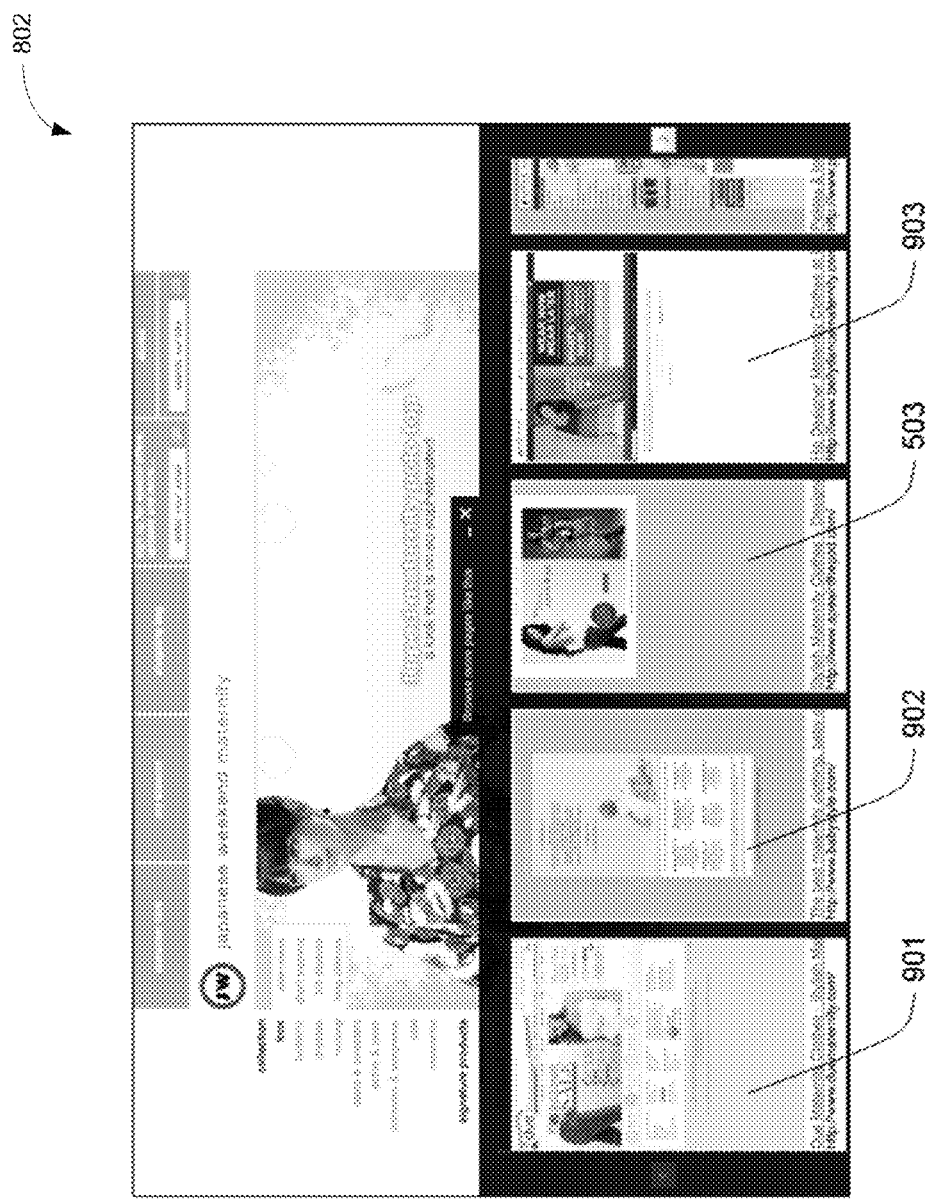
FIG. 9 illustrates an example of displaying thumbnail images of related webpages for the selected related website of FIG. 8.

The process may start over again from the selected related webpage or website 802. As shown in FIG. 9, because the second selected related webpage or website 802 was related to the initial webpage or website, some of the webpages or websites suggested as being related to the initial webpage or website may be the same (such as thumbnail 503). The initial website or webpage may also be displayed as related to the second selected related website or webpage, as indicated in a first thumbnail image 901. Yet other related websites or webpages, such as the webpages or websites displayed in the second thumbnail image 902 and the third thumbnail image 903, may be shown as related to the second site but not the first. Showing suggestions when the user hits back arrow back to the Search Engine Results Page SERP.

As set forth herein, the browser 300 is also advantageous in its ability to accommodate a wide variety of alternatives. By way of example and without limitation:

The thumbnail images of related webpages or websites may be automatically displayed next to webpages or websites.

Different thumbnail image sizes, including height/width proportions may be selected in advance for different scenarios so as to emphasize—as the case may be—legibility of brands, overall structure, patterns and details. Thumbnail images sizes may be selected dynamically based on an analysis of the webpages or websites in view of the foregoing criteria and current scenario.

A search engine may provide the users an option of displaying images of related sites by (1) selecting, such as by clicking, a button next to one of the returned search results, (2) framing the webpage and (3) displaying, in the lower frame, the images of the sites that are related to the selected search result as hyperlinks to the related webpages or websites. This aspect may be implemented on any browser 300 operative to provide browser frames without the use of an additional module, such as a browser plug-in.

Figure 10:
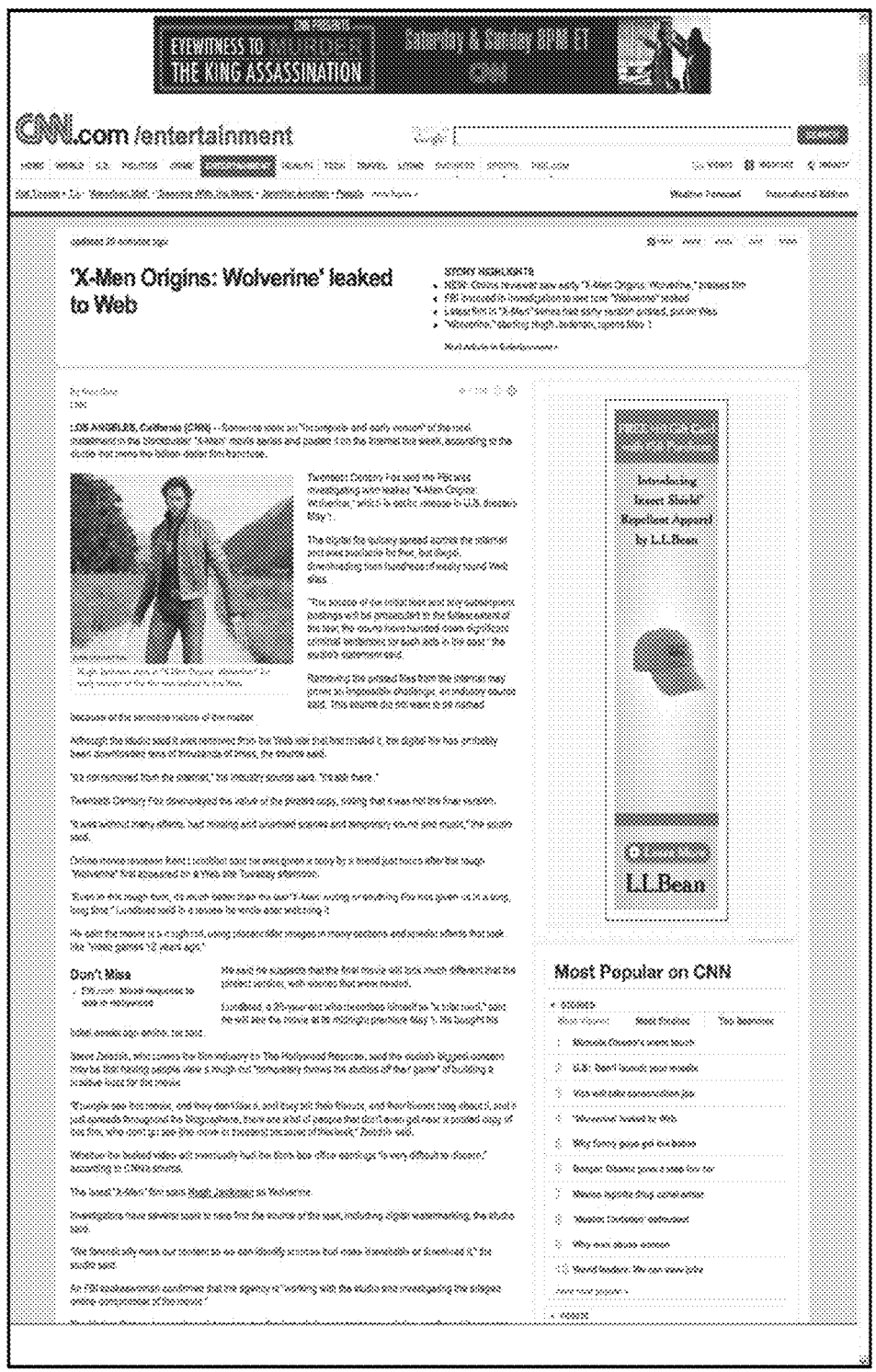
FIG. 10 illustrates another example of displaying a webpage currently being viewed.
Figure 11:
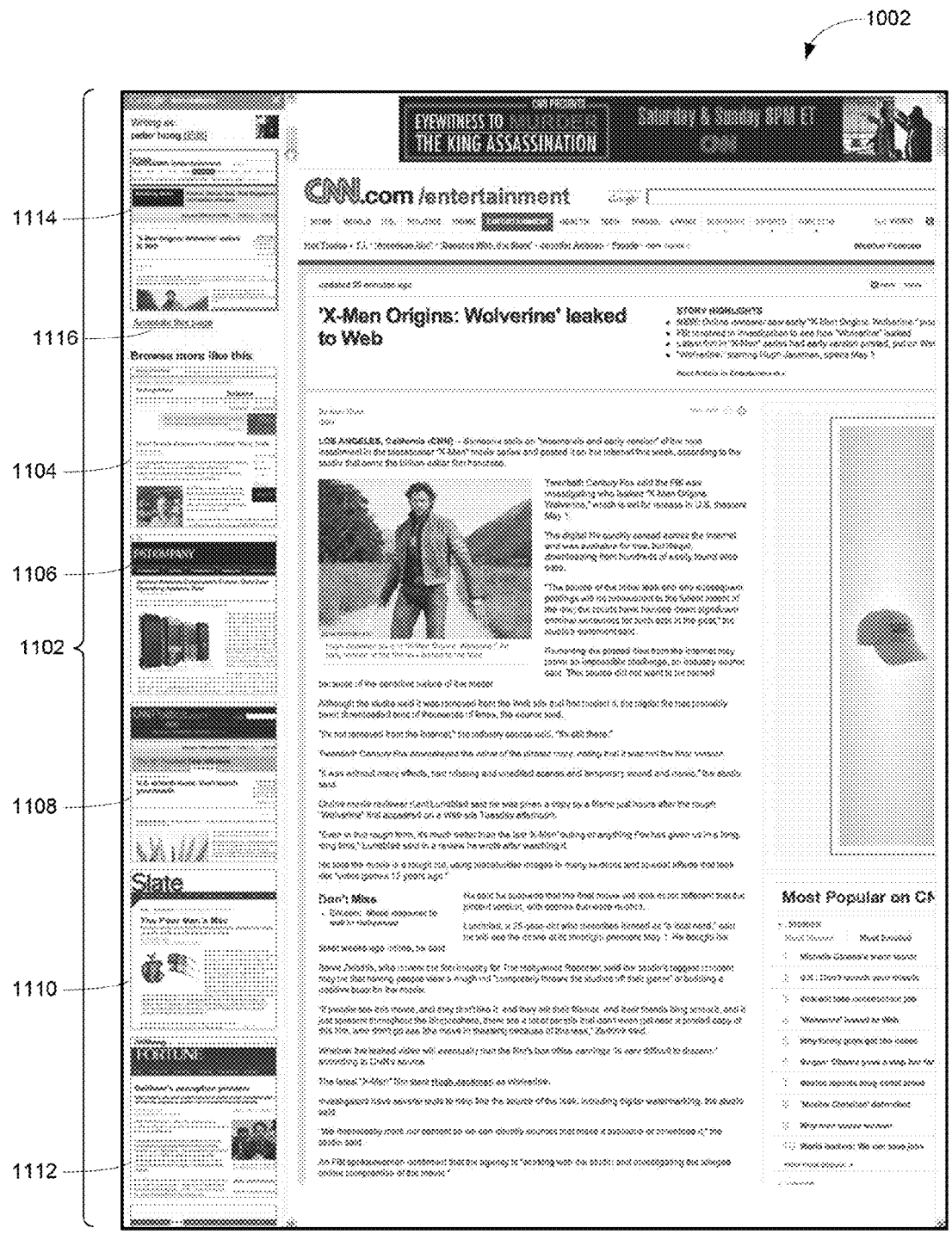
FIG. 11 illustrates one example of displaying a personalized portion within a graphical user interface along with the webpage of FIG. 10.

Referring next to FIG. 10, is an example of a webpage or website 1002 currently be viewed by a user in an browser 300. FIG. 11 shows the webpage or website 1002 being viewed by the user along with a personalized portion 1102 of the browser 300 established as a search result area for related webpages or websites displayed as thumbnail images 1104-1112. The personalized portion 1102 may be customized on a per user basis based on a provided login and password. Furthermore, the personalized portion 1102 of the browser 300 may be a sidebar of the browser 300, an iframe displayable by the browser 300, a separate module that may be added to the Internet browser 300, such as a browser plug-in or other extension, or any combination thereof.

In addition, the personalized portion 1102 of the browser 300 may include a thumbnail image 1114 of the webpage or website 1002 being viewed by the user along with one or more functions for interacting with the personalized portion 1102 of the browser 300. The one or more functions may assist a user to personalize search results of related webpages or websites, to provide comments for a currently viewed webpage or website, to promote or demote suggestions relating to alternative and/or related webpages or websites, or other functions. In one implementation, the personalized portion 1102 may include a selectable element 1116, such as a hyperlink, graphical button, other selectable element for initializing the one or more functions. As shown in FIG. 11, the selectable element 1116 indicates that an annotation function for annotating the webpage displayed in the thumbnail image 1114 may be initialized be selecting the selectable element 1116.

Figure 12:
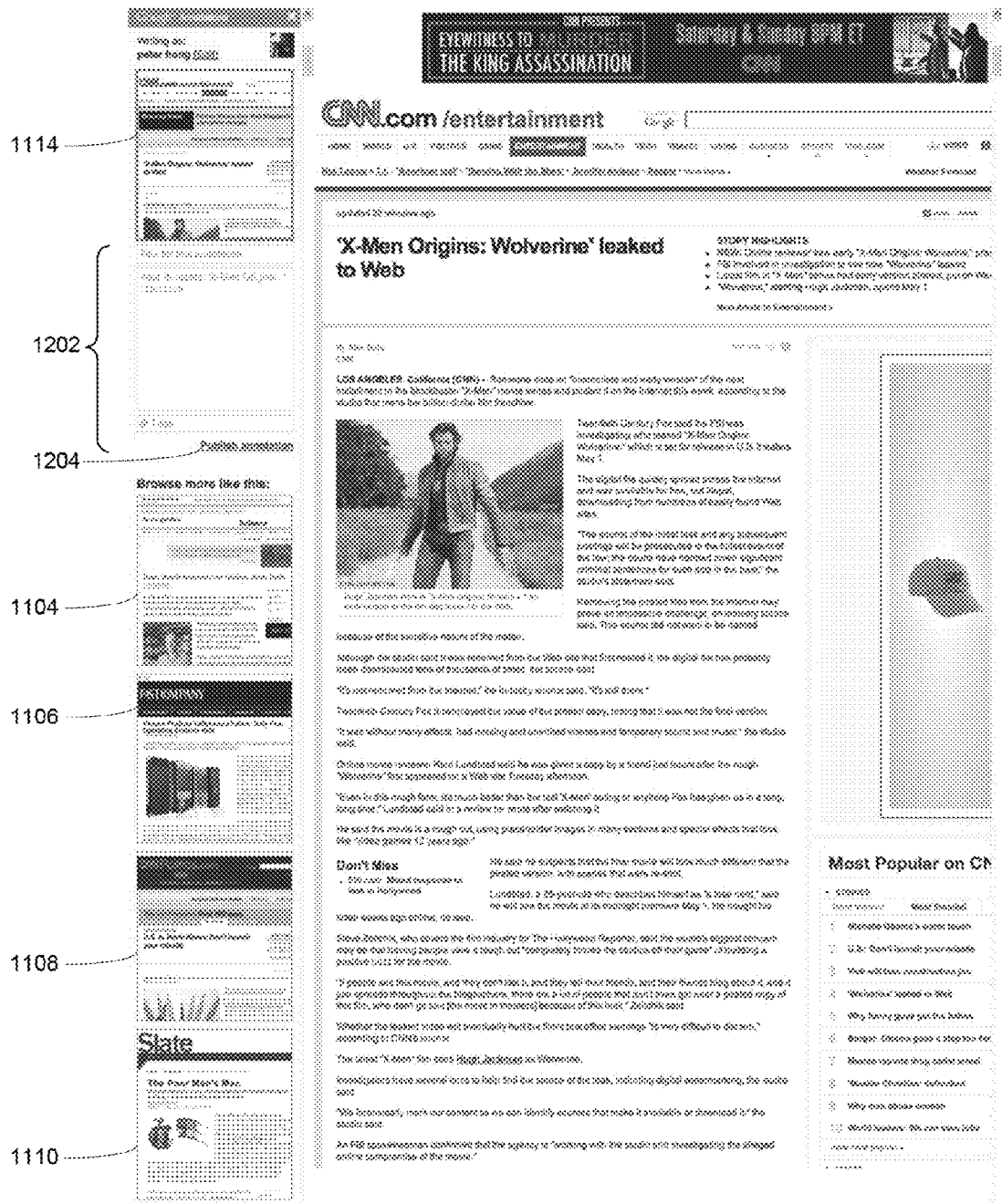
FIG. 12 illustrates an example of selecting a selectable element to annotate a webpage displayed in a thumbnail image.

FIG. 12 illustrates an example of selecting the selectable element 1116 to annotate the webpage displayed in the thumbnail image 1114. When the selectable element 1116 is selected, the browser 300 may provide for a selectable element area 1202 corresponding to the function identified by the selectable element 1116. As the selectable element 1116 corresponds to an annotation function, the selectable element area 1202 may include one or more sections for annotating the webpage displayed in the thumbnail image 1114. The selectable element area 1202 may also include an additional selectable element 1204 corresponding to a publishing function that, when selected, may publish the annotation provided for the webpage displayed in the thumbnail image 1114. Other selectable elements may also be displayed in the selectable element area 1202.

Figure 13:
FIG. 13 illustrates one example of displaying additional information for a webpage displayed in a thumbnail image.

FIG. 13 illustrates one example of displaying additional information for a webpage displayed in a thumbnail image 1108. In one implementation, the browser 300 may display additional information about a webpage displayed in a thumbnail image 1108 when the user performs an action. For example, the browser 300 may display the additional information as a description of the website as a pop-up image 1302 when the user hovers or places a mouse cursor over the thumbnail image 1108. In general, a "pop-up" is a window of a graphical user interface that is displayed to the user by being overlaid on top of another window containing the content currently being viewed by the user.

Figure 14:
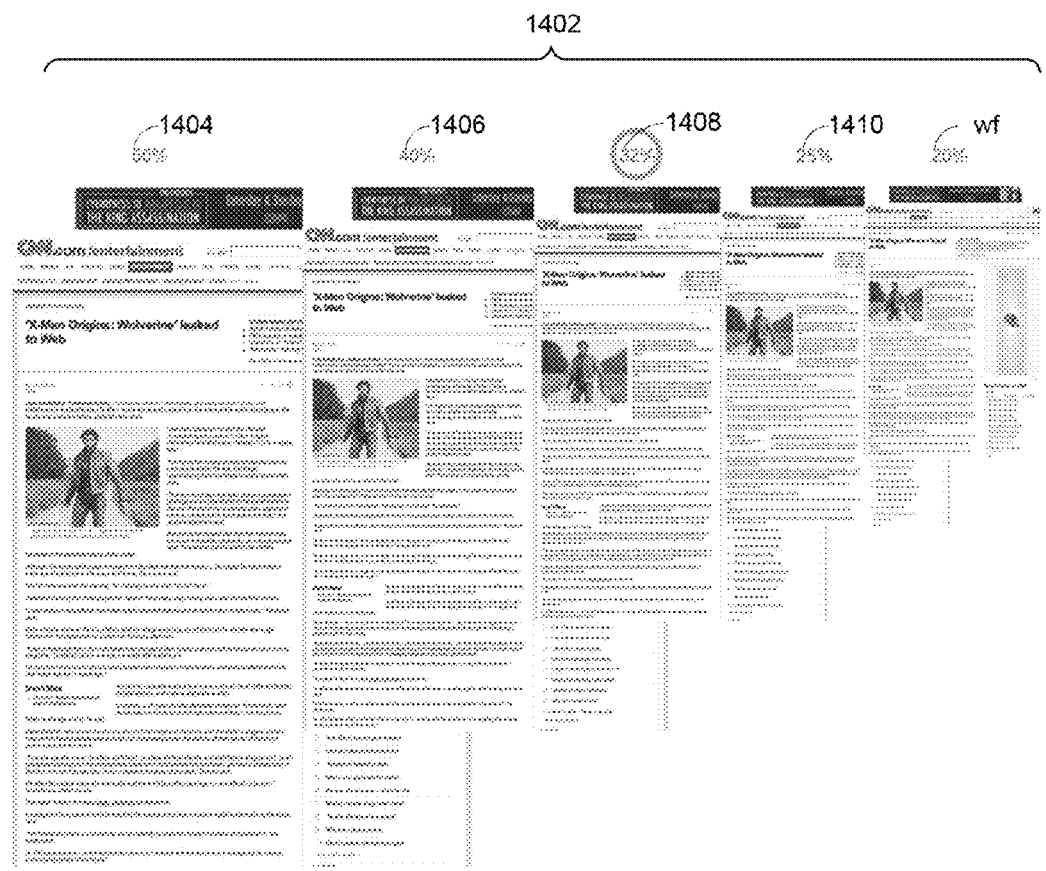
FIG. 14 illustrates one example of previously configured zoom levels for displaying thumbnail images.

In displaying the thumbnail images of related webpages or websites, the browser 300 may display the thumbnail images according to one or more zoom levels. FIG. 14 illustrates one example of previously configured zoom levels 1402 that the browser 300 may select for displaying the thumbnail images. In one implementation, the zoom levels 1402 include a first zoom level 1404 that displays a webpage at a 50% zoom level, a second zoom level 1406 that displays the webpage at a 40% zoom level, a third zoom level 1408 that displays the webpage at a 32% zoom level, a fourth zoom level 1410 that displays the webpage at a 25% zoom level, and a fifth zoom level 1412 that displays the webpage at a 20% zoom level. In addition, the browser 300 may select a zoom level dynamically apart from the determined zoom levels 1402. For example, the browser 300 may display the webpage in a thumbnail image at dynamically selected zoom level, such as 38%, rather than from the set of predetermined zoom levels 1402.

The selection of a previously determined zoom level 1404-1412 or a dynamic zoom level may be based on one or more preferences grouped according to overall appearance or discernibility. For example, where the preferences for viewing a webpage indicate a desire for overall appearance, such as an increase in viewing of the webpage structure and relative content patterns, the browser 300 may select the third zoom level 1408, the fourth zoom level 1410, or the fifth zoom level 1412. Alternatively, where the preferences for viewing in a thumbnail image is for the legibility of content, brand, header text, body text, or any other content on the webpage, the Internet browser 300 may select the first zoom level 1404, the second zoom level 1406, or the third zoom level 1408. Moreover, an optimal zoom level may selected from the set of zoom levels 1402 that offers a determined best balance of brand recognition, photos, page structure, header quality, or other characteristic of the webpage.

As described above, one or more zoom levels, such as the third zoom level 1408, may be selectable by the browser 300 where either overall appearance or discernibility is desired.

Figure 15:
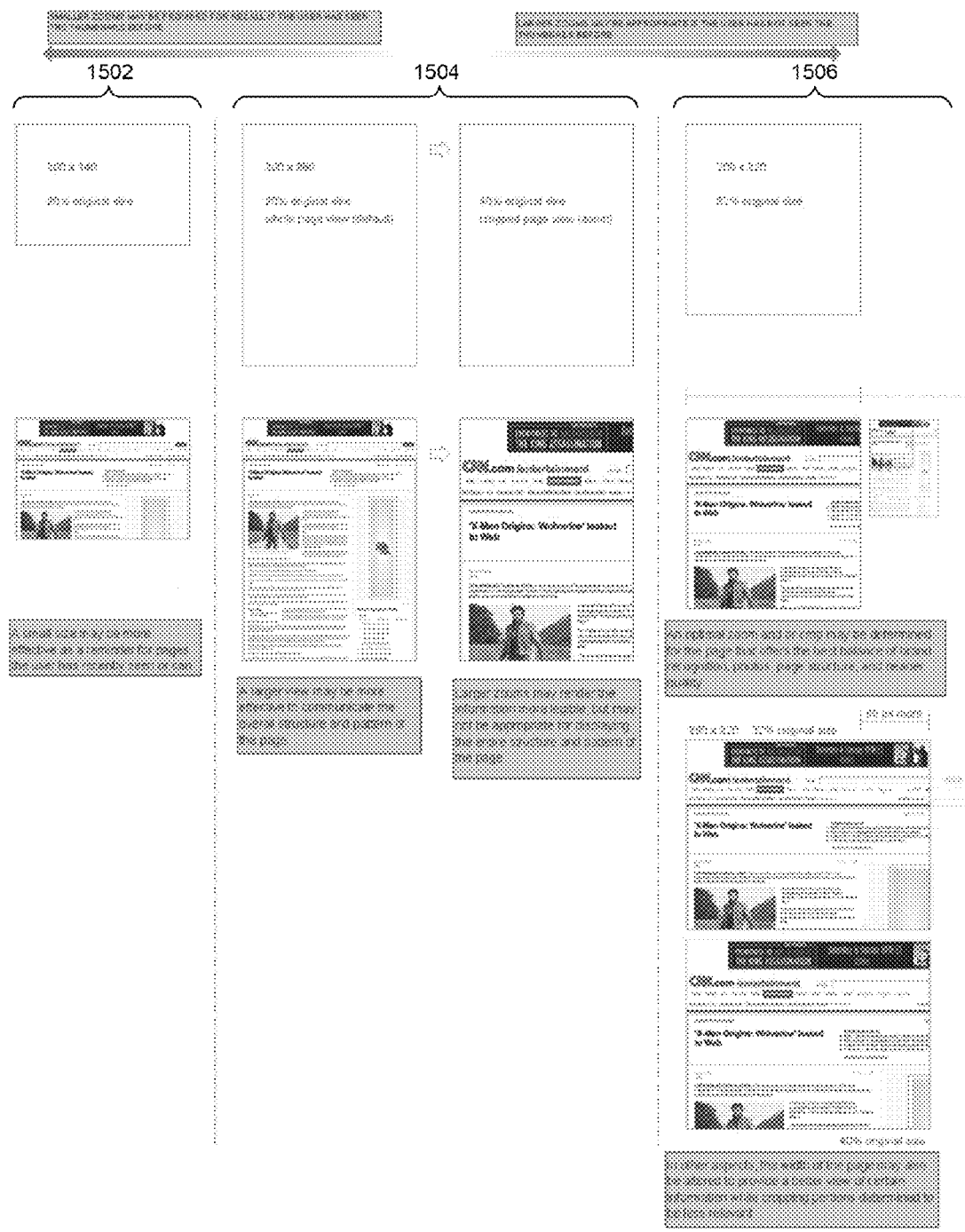
FIG. 15 illustrates examples of displaying a thumbnail image at varying zoom levels depending on the context of where the thumbnail image is displayed.

FIG. 15 illustrates examples of displaying a thumbnail image at varying zoom levels depending on the context of where the thumbnail image is displayed and/or whether a user has previously seen the webpage displayed in the thumbnail image. In one implementation, the browser 300 may configured for displaying the thumbnail image in a first context 1502, a second context 1504, and a third context 1506, or combinations thereof.

The first context 1502 may be where the thumbnail image is to be displayed as part of a new tab for the Internet browser 300. In general, tabbed browsing refers to using a graphical user interface that allows multiple documents to be contained within a single window, using a "tab" as a navigational widget for switching between the sets of documents. As is known in the art, a "tab" of an Internet browser 300 is often modeled after a traditional card inserted in a paper file or card indexes. Hence, a tab facilitates the display of multiple webpages within the same Internet browser 300 and within the same window of the graphical user interface for the browser 300.

In one implementation, the thumbnail image for the first context is displayed at a predetermined zoom level and cropping. For example, the webpage for display in the thumbnail image may be displayed at 20% of the original dimensions of the webpage for display in the thumbnail image, or the webpage for display in the thumbnail image may be cropped so as to have a length of 200 pixels and a width of 140 pixels.

The second context 1504 may be where the thumbnail image is to be displayed as part of an extension or plug-in for the browser 300. With regard to the second context 1504, the thumbnail image of the webpage may be displayed at predetermined zoom level and cropping, such as at 20% of the original dimensions of the webpage for display in the thumbnail image, or the webpage for display in the thumbnail image may be cropped so as to have a length of 200 pixels and a width of 280 pixels. Alternatively, the browser 300 may display the thumbnail image at another zoom level and cropping for the second context 1504, such as at a zoom level of 40% of the original dimensions of the webpage for display in the thumbnail image.

The third context 1506 may be where the thumbnail image is displayed as part of a personalized portion of the browser 300. With regard to the third context 1506, the thumbnail image of the webpage may be displayed at predetermined zoom level and cropping, such as at 32% of the original dimensions of the webpage for display in the thumbnail image, or the webpage for display in the thumbnail image may be cropped so as to have a length of 200 pixels and a width of 140 pixels.

Moreover, the browser 300 may select the size of the thumbnail image according to whether the user has previously seen the thumbnail image. In one implementation, the Internet browser 300 may display a smaller thumbnail image (e.g., a thumbnail image having a smaller zoom level or with less cropping) where the user has previously seen the thumbnail image. In another implementation, the browser 300 may display a larger thumbnail image (e.g., a thumbnail image having a larger zoom level or with more cropping) where the user has not previously seen the thumbnail image.

FIG. 16(*a*) and FIG. 16(*b*) illustrate alternative examples of modifying the content of a webpage displayed in a thumbnail image. As shown in FIG. 16(*a*) and FIG. 16(*b*), the content of a webpage may be modified to reproduce one or more elements of a webpage, such as graphic images or text, that are determined as relevant or memorable, while other portions of the webpage determined to be less relevant may be cropped or suppressed. The modification of the webpage displayed in the thumbnail image may be performed by the browser 300, the server 110, or any other component or combination of components in communication with the Internet.

The systems, components, and logic described above may be implemented in many different ways, including a combination of hardware and software, or as software for installation on any desired operating system including Linux, UNIX, or Windows. The functionality may be implemented in a single system or functionally partitioned across multiple systems. As another example, the components, systems, and logic may be implemented as computer-executable instructions or as data structures in memory and may be stored on, distributed across, or read from many different types of machine-readable media or computer-readable storage devices. The machine-readable media or computer-readable storage devices may include RAM, ROM, hard disks, floppy disks, CD-ROMs, flash memory or other machine-readable medium. The components, systems and logic may also be encoded in a signal, such as a signal received from a network or partitioned into sections and received in multiple packets communicated across a network.

The systems may be implemented in software, hardware, or a combination of software and hardware. The systems may be implemented in a computer programming language, such as C# or Java, or any other computer programming language now known or later developed.

Furthermore, the systems may be implemented with additional, different, or fewer components. As one example, a processor or any other logic or component may be implemented with a microprocessor, a microcontroller, a DSP, an application specific integrated circuit (ASIC), program instructions, discrete analog or digital logic, or a combination of other types of circuits or logic. As another example, memories may be DRAM, SRAM, Flash or any other type of memory. The systems may be distributed among multiple components, such as among multiple processors and memories, optionally including multiple distributed processing systems.

Logic, such as programs or circuitry, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

Moreover, one or more networks may be implemented as any combination of networks. A network may be a WAN, such as the Internet; a LAN; a PAN, or a combination of WANs, LANs, and PANs. Moreover, a network may involve the use of one or more wired protocols, such as SOAP; wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol now known or later developed.

Interfaces between the systems and the logic and modules within systems may be implemented in numerous ways. For example, interfaces between systems may be Web Services, Simple Object Access Protocol, or Enterprise Service Bus interfaces. Other examples of interfaces include message passing, such as publish/subscribe messaging, shared memory, and remote procedure calls.

Unless otherwise stated, the foregoing embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims. It will also be understood that the provision of examples of the invention (as well as clauses phrased as "such as," "including" and the like) should not be interpreted as limiting the invention to the specific examples; rather, the examples are intended to illustrate only one of many possible embodiments.

The invention claimed is:

1. A system for displaying images of websites related to a viewed website, the system comprising:
  a graphical user interface of a web browser operative to display a website for viewing by a user;
  an input interface provided by the web browser, wherein the input interface is operative to receive an input representative of a request for a related website that is determined as being related to the website for viewing by the user by comparing the textual content of the related website with textual content of the website for viewing by the user; and,
  a processor for managing the graphical user interface and the input interface, the processor being operative to:
    receive a request via the input interface for the related website that is related to the website being viewed by the user;
    transmit the request for the related website to a search engine operative to search for the related website, the search being performed in response to the request received via the input interface; and,
    obtain a search result representative of the related website, wherein the search result comprises:
      a related website image representative of the related website; and
      a uniform resource locator representative of a location of the related website; wherein:
    the processor is further operative to cause the graphical user interface to display the search result simultaneously with the website for viewing by the user.

2. The system of claim 1, wherein:
  the graphical user interface is further operative to display the search result simultaneously with the website for viewing by the user by:
  displaying a personalized portion within the graphical user interface adjacent to the website for viewing by the user; and,
  displaying the search result within the personalized portion.

3. The system of claim 1, wherein the processor is further operative to render the related website image based on the uniform resource locator of the search result.

4. The system of claim 1, wherein the related website is determined as being related to the website for viewing by the user by comparing the visual similarity of the related website and the website for viewing by the user.

5. The system of claim 1, wherein:
  the search result is a first search result;
  the processor is further operative to obtain a set of search results including the first search result, wherein:
    each search result of the set of search results is a different search result; and,
    each search result comprises:
      the related website image representative of the respective related website; and,
      a uniform resource locator representative of location of the related website; and,
  the graphical user interface is further operative to display the set of search results simultaneously with the website for viewing by the user.

6. The system of claim 1, wherein the graphical user interface is further operative to display the related website image in a landscape orientation.

7. The system of claim 1, wherein:
  the related website image comprises a webpage of the related website; and,
  the webpage of the related website is completely displayed in the related website image.

8. The system of claim 1, wherein:
  the related website image comprises a webpage of the related website; and, the webpage of the related website is partially displayed in the related website image.

9. The system of claim 1, wherein:
the related website comprises:
- a homepage that is displayable to the user as a front page of the related website when the user visits the related website; and,
- a webpage that is displayable to user that is different than the homepage; and,
- the related website image comprises the webpage of the related website.

10. A method for displaying images of websites related to a viewed website, the method comprising:
- displaying within a graphical user interface of a web browser, on a display device, a website for viewing by a user;
- receiving, with an input interface provided by the web browser, an input representative of a request for a related website that is determined as being related to the website for viewing by the user by comparing textual content of the related website with textual content of the website for viewing by the user;
- transmitting, with a processor, the request for the related website to a search engine operative to search for the related website, the search being performed in response to the received request;
- obtaining, with the processor, a search result representative of the related website, wherein the search result comprises:
  - a related website image representative of the related website; and
  - a uniform resource locator representative of a location of the related website; and,
- displaying, on the display device, the search result simultaneously with the website for viewing by the user.

11. The method of claim 10, further comprising:
displaying the search result simultaneously with the website for viewing by the user by:
- displaying a personalized portion within the graphical user interface adjacent to the website for viewing by the user; and,
- displaying the search result within the personalized portion.

12. The method of claim 10, further comprising:
rendering, with the processor, the related website image based on the uniform resource locator of the search result.

13. The method of claim 10, wherein the related website is determined as being related to the website for viewing by the user by comparing the visual similarity of the related website and the website for viewing by the user.

14. The method of claim 10, wherein the search result is a first search result, and further comprising:
obtaining a set of search results comprising the first search result, wherein:
- each search result of the set of search results is a different search result; and,
- each search result comprises:
  - a related website image representative of a related website; and,
  - a uniform resource locator representative of a location of the related website; and,
- displaying, on the display device, the set of search results simultaneously with the website for viewing by the user.

15. The method of claim 10, wherein the method further comprises displaying, on the display device, the related website image in a landscape orientation.

16. The method of claim 10, wherein:
the related website image comprises a webpage of the related website; and, the method further comprises:
displaying, on the display device, the webpage of the related website such that the webpage of the related website is completely displayed in the related website image.

17. The method of claim 10, wherein:
the related website image comprises a webpage of the related website; and, the method further comprises:
displaying, on the display device, the webpage of the related website such that the webpage of the related website is partially displayed in the related website image.

18. The method of claim 10, wherein:
the related website comprises:
- a homepage that is displayable to the user as a front page of the related website when the user visits the related website; and,
- a webpage that is displayable to user that is different than the homepage; and,
- the related website image comprises the webpage of the related website.

* * * * *